(12) United States Patent
Sasaki

(10) Patent No.: US 6,952,272 B1
(45) Date of Patent: Oct. 4, 2005

(54) ELECTRONIC STILL CAMERA WITH PRINTER AND PRINTER WITH MONITOR

(75) Inventor: Hidemi Sasaki, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 694 days.

(21) Appl. No.: 09/615,732

(22) Filed: Jul. 13, 2000

(30) Foreign Application Priority Data

Jul. 14, 1999 (JP) ................................ 11-201035

(51) Int. Cl.[7] .......................................... G06F 15/00
(52) U.S. Cl. .................... 358/1.1; 358/1.18; 358/527
(58) Field of Search .............................. 358/1.1, 1.18, 358/909.1, 303, 527; 396/30, 429; 348/47, 348/51, 336.06, 353.11, 373–376; 386/31

(56) References Cited

U.S. PATENT DOCUMENTS 4,262,301 A * 4/1981 Erlichman ................... 386/31
5,917,548 A * 6/1999 McIntyre ............... 348/333.06
6,628,333 B1 * 9/2003 Gowda et al. ......... 348/333.11

FOREIGN PATENT DOCUMENTS

WO    99/21055    4/1999    ......... G03B 17/52

* cited by examiner

Primary Examiner—Twyler Lamb
(74) Attorney, Agent, or Firm—Sughrue Mion, PLLC

(57) ABSTRACT

An electronic still camera has a camera section for photographing a subject as an electronic image through an image sensor and recording it as digital image data in a memory, and an optical printer section for printing the electronic image on an instant photo film sheet based on the digital image data. An LCD monitor of the same size as a printing area of the instant photo film sheet is mounted on a camera body, for displaying an image based on the digital image data at the same magnification as when the image is printed on the photo film sheet.

17 Claims, 6 Drawing Sheets

ELECTRONIC STILL CAMERA WITH PRINTER AND PRINTER WITH MONITOR

BACKGROUND OF THE INVENTION

1. Field of the Invention

The present invention relates to an electronic still camera with a printer and a monitor incorporated therein. The printer makes a hard copy of an electronic image based on an electronic image signal that is picked up through an imaging device of the electronic still camera or read out from a memory, whereas the monitor displays the image based on the electronic image signal, prior to printing the image. The present invention relates also to a printer with a monitor incorporated therein, for displaying an image based on an electronic image signal fed in the printer, prior to printing the image based on the electronic image signal.

2. Background Arts

Electronic still cameras have recently been widely used that form an optical image of a subject on an image sensor through a camera lens, convert the optical image into an electronic image signal, and write it in a digital form on a memory. Some of the electronic still cameras are provided with an electronic viewfinder that displays moving images of the subject in the photographic field of the camera lens based on the electronic image signals from the image sensor. As the electronic viewfinder, an LCD panel has widely been used.

It is also known in the art to incorporate a printer into the electronic still camera, for making a hard copy of the photographed image instantly on the basis of the image data. An example of electronic still camera with a printer section is one described in WO99/21055, wherein the printer section makes a hard copy of an image by exposing an instant film sheet through a linear optical printing head that is driven in accordance with image data of the image read out from a memory. The instant film sheet is processed by its own processing fluid that is automatically spread on the instant film sheet while the instant film sheet is squeezing out of the camera through a pair of film processing rollers, in the same way as in a conventional instant camera.

Although the electronic still camera of this prior art makes it possible to get a hard copy of the photographed image with ease without bothering portability of the camera, since the electronic viewfinder doubles as a monitor for displaying a photographed still image, the displayed still image does not always adequately simulate the finished print. Especially where the electronic viewfinder is so small that it displays the image at a reduced magnification compared to the printed image, it is difficult to imagine the finished condition from the displayed image, so the finished print can be sometimes disappointing.

SUMMARY OF THE INVENTION

In view of the foregoing, an object of the present invention is to provide an electronic still camera with a printer incorporated therein, that can display an image in a fashion facilitating to imagining a printed condition of that image.

Another object of the present invention is to provide a printer with a monitor that can display an image adequately simulating the finished print.

According to the invention, an electronic still camera with a printer incorporated therein, characterized by comprising a monitor that is incorporated into a camera body and is able to display an image based on the electronic image signal at approximately the same magnification as when the image is printed on a recording material by the printer.

According to a preferred embodiment, the monitor is approximately equal in size to a predetermined printing area of the recording material, and consists of pixels of a number that is approximately equal to the number of pixels of the image printed in the printing area.

The monitor may double as an electronic viewfinder for displaying moving images of the subject in a real time fashion, or it is possible to provide a smaller size electronic viewfinder in addition to the monitor.

According to the present invention, a printer for printing an image on a recording material based on an electronic image signal comprises a monitor that is incorporated into a printer body, for displaying the image to be printed on the recording material based on the electronic image signal at approximately the same magnification as when printed on the recording material.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
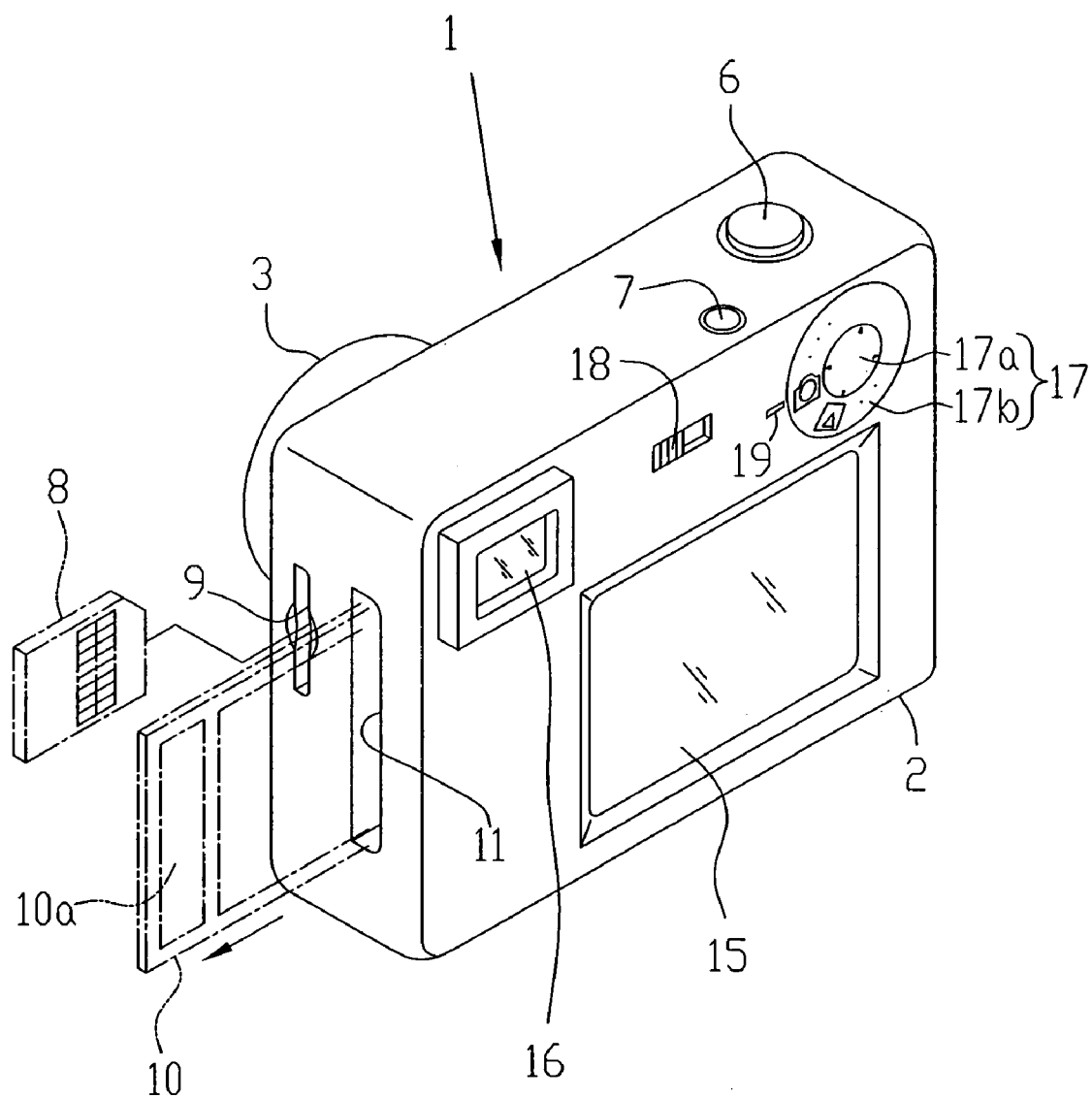
FIG. 1 is a rear perspective view of an electronic still camera according to a preferred embodiment of the invention.

An electronic still camera 1 shown in FIG. 1 has a camera section and a printer section which are incorporated into a single body 2. The camera section photographs a subject as an electronic image and records it as digital image data, whereas the printer section prints an image of the subject on a sheet of conventional photographic instant film on the basis of the image data.

A camera lens 3 is disposed on a front side of the camera body 2. A shutter button 6 and a print start button 7 are disposed on a top side of the camera body 2. On one side of the camera body 2, there are formed a memory slot 9 for a memory card 8, e.g. a smart media (a trade name), and a film ejection slot 11 for ejecting an instant film sheet 10 after having a latent image printed thereon.

Figure 2:
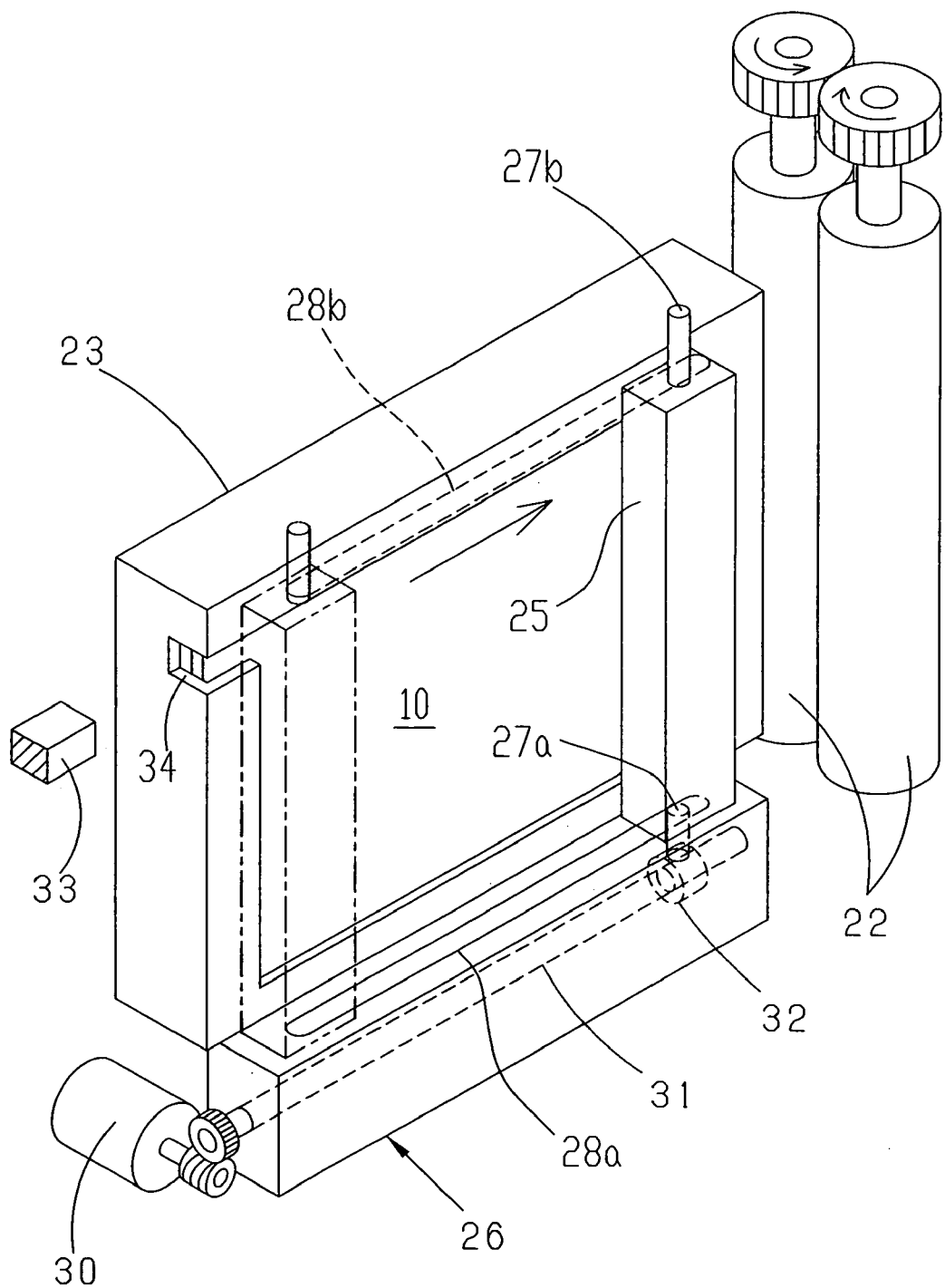
FIG. 2 is a perspective view of a printer section of the electronic still camera.

The instant film sheet 10 is of a conventional mono-sheet type self-developing film unit with a pod 10a of processing fluid. As shown in FIG. 2, a pair of film processing rollers 22 are disposed behind the film ejection slot 11, which are rotated to feed the instant film sheet 10 out to the film ejection slot 11. While squeezing through the film processing rollers 22, the pod 10a is ruptured and the processing fluid is spread on the instant film sheet 10, developing the latent image into a positive image in a few minutes after the ejection. A plurality of these instant film sheets 10 are packaged into a film pack 23, and is loaded in the electronic still camera 1.

Referring back to FIG. 1, a large LCD panel 15 and a small LCD panel 16, a multi-operation member 17 and a power switch 18 are disposed on a back side of the camera body 2. The small LCD panel 16 serves as an electronic viewfinder that displays moving images of subjects existing in a photographic field of the camera lens 3 in a real time fashion. The large LCD panel 15 serves as a monitor for displaying images based on image data stored in the memory card 8 or other memory devices. The large LCD panel 15 is determined to be substantially equal in size to a printing area of the instant film sheet 10, and is substantially equal in pixel number to the image printed on the instant film sheet 10, wherein each pixel consists of color components of red, green and blue. Therefore, the large LCD panel 15 may display an image that is approximately equal in size and pixel density to the positive image formed on the instant film sheet 10. Thus, the photographer can preview an image simulating the finished print with high fidelity.

The multi-operation member 17 consists of a center round button 17a and a peripheral ring dial 17b. The round button 17a is operated for digital zooming, whereas the ring dial 17b has icons indicating operation mode options thereon, and is rotated around the round button 17a to align one of the icons with an index 19, to select a corresponding operation mode. Through this multi-operation member 17, a variety of operations are carried out in a photography mode and in a reproduction mode. The print start button 7 is operated to start printing an image displayed on the large LCD panel 15.

As shown in FIG. 2, the printer section is mainly constituted of an optical printing head 25, a head carrying mechanism 26, the film processing rollers 22, and a claw member 33. The printing head 25 extends along a widthwise direction of the instant film sheet 10, hereinafter called a main scan direction, that is perpendicular to the ejecting direction of the instant film sheet 10 as indicated by an arrow in FIG. 2. An axle 27a or 27b formed on either end of the printing head 25 is inserted in a slot 28a or 28b respectively, such that the axles 27a and 27b may slide along the slots 28a and 28b. Because the slots 28a and 28b extend in a sub scan direction that is parallel to the film ejecting direction, the printing head 25 is movable in the sub scan direction.

The head carrying mechanism 26 is mainly constituted of a scanning motor 30, a lead screw 31 driven by the scanning motor 30, a movable member 32 mounted on the lead screw 31 to move along the lead screw 31 with the rotation of the lead screw 31. Since the axle 27a of the printing head 25 is secured to the movable member 32, the printing head 25 moves in the sub scan direction with the rotation of the scanning motor 30.

The scanning motor 30 is a bi-directional stepping motor. The printing head 25 is moved from a first terminal position shown by phantom lines in FIG. 2 to a second terminal position shown by solid lines in response to forward rotation of the motor 30. Synchronously with this movement, the printing head 25 records a first color frame of a full-color image on the instant film sheet 10 line after line. A second color frame is recorded as the printing head 25 moves from the second terminal position to the first terminal position after printing the first color frame. A third color frame is recorded as the printing head 25 moves from the first terminal position to the second terminal position. Thus, the printing head 25 moves three times between the terminal positions to record the full-color image on the instant film sheet 10 in a color frame sequential fashion. This method is preferable to save the total printing time per one image.

After the full-color image is recorded on the instant film sheet 10, the claw member 33 is activated to push the instant film sheet 10 out of the film pack 23 toward the film processing rollers 22. Then, the instant film sheet 10 is nipped between the film processing rollers 22, and is fed out of the camera body 2 through the film ejection slot 11 by rotating the film processing rollers 22. The claw member 33 and the film processing rollers 22 are driven by a developing motor 73 (see FIG. 4) through a mechanism that is used in a conventional instant camera.

Figure 3:
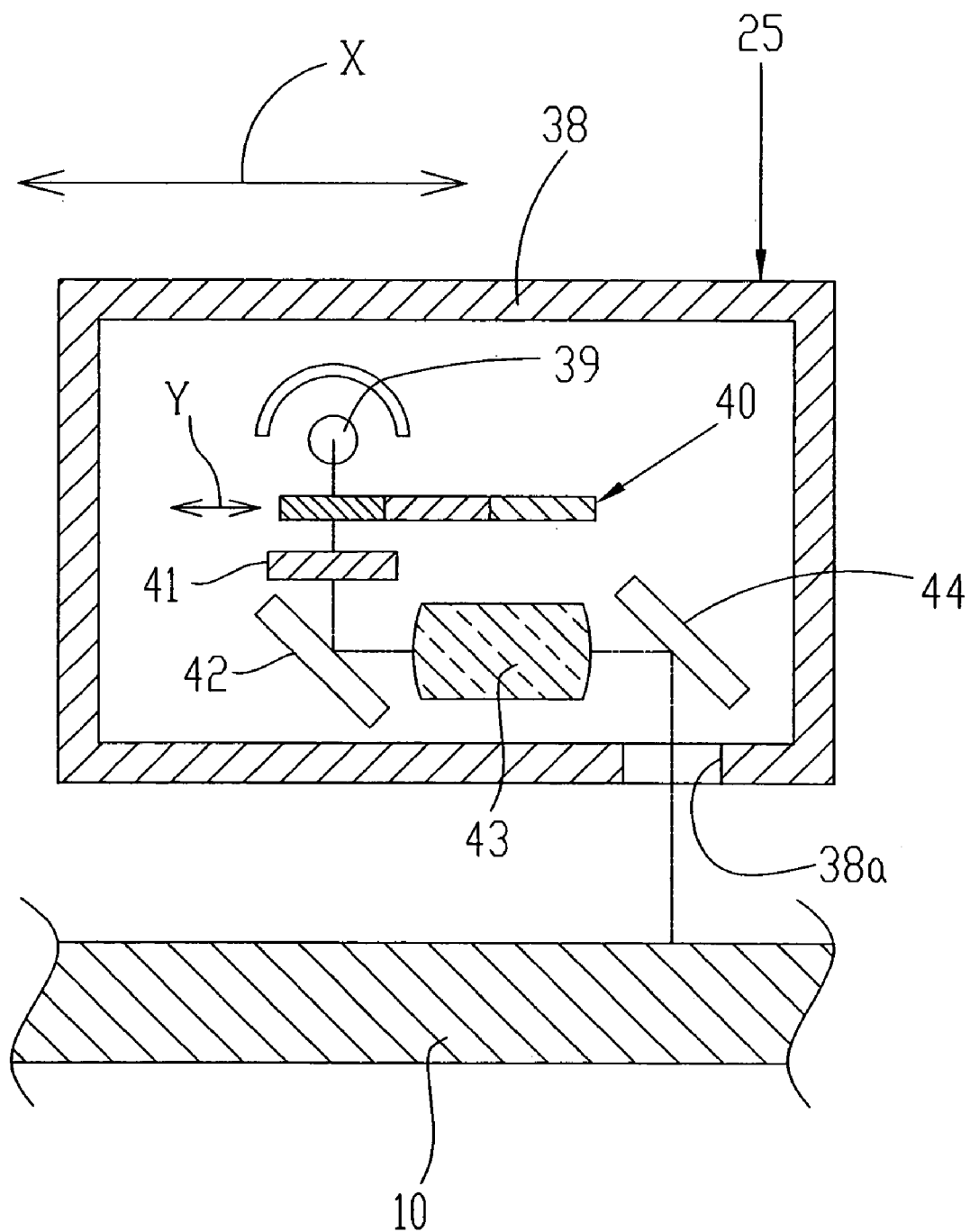
FIG. 3 is an explanatory diagram illustrating an optical printing head of the printer section.

FIG. 3 shows an example of the printing head 25. In a light-tight housing 38 is mounted a fluorescent lamp 39 that is elongated in the lengthwise direction of the printing head 25, i.e. the main scan direction. Illuminating light from the fluorescent lamp 39 includes light components of red, green and blue. Instead of the fluorescent lamp 39, another kind of light source may be used insofar as it emits light including those three primary color components.

A color filter 40 is placed in a path of the illuminating light. The color filter 40 consists of a red pass filter portion, a green pass filter portion and a blue pass filter portion, which extend along the fluorescent lamp 39 and are arranged side by side in a perpendicular direction Y to the fluorescent lamp 39. Since the printing head 25 and thus the fluorescent lamp 39 extend in the main scan direction, the direction Y corresponds to the sub scan direction. By shifting the color filter 40 in the direction Y in response to a filter switching signal, those filter portions are positioned one by one in the illuminating light path.

Thus, one of the three color components of the illuminating light from the fluorescent lamp 39 that passes through the color filter 40, is directed to an opening 38a of the housing 38 through an LCD array 41, a mirror 42, a micro lens array 43 and a mirror 44, and then projected as printing light of one color onto the instant film sheet 10. The LCD array 41 consists of a plurality of micro liquid crystal segments aligned in a line along the fluorescent lamp 39. One liquid crystal segment corresponds to one pixel of the printed image, and is each individually controlled to change its transparency according to image data of each pixel that represents a density value of one color component of that pixel.

Accordingly, the number of liquid crystal segments of the LCD array 41 is equal to the number of pixels of one main scanning line, i.e. a line extending across the width of the printing area of the instant film sheet 10. The number of pixels in one main scanning line is approximately equal to the number of pixels of the large LCD panel 15 along its width or shorter side, whereas the number of main scanning lines formed on the printing area per each color frame, i.e. per one sub scanning of the printing head 25, is approximately equal to the number of pixels of the large LCD panel 15 along its length or longer side. Thus the total number of pixels of each image printed in the printing area comes to be substantially equal to the total number of pixels of the large LCD panel 15.

The micro lens array 43 consists of an array of micro cylindrical lenses, called SELFOC lens (a trade name), that prevents the printing light after passing through the individual liquid crystal segment from diverging to other pixel areas. Therefore, the number of micro cylindrical lenses of the micro lens array 43 is also equal to the number of pixels in one main scanning line. The housing 38 is made to be light-tight, so the printing light is projected only through the opening 38a.

The printing head 25 may have another constitution. For example, micro light emitting diodes (LED) of red, green and blue may be used as a light source. In that case, the color filter 40 and the LED array 41 may be omitted. Density of each pixel may be adjusted by controlling light intensity of the micro LEDs. The micro LEDs of one color are aligned in a line, and are driven sequentially from one color to another for recording a full-color image in the color frame sequential fashion. Alternatively, the three color micro LEDs are driven concurrently to project the printing light of three colors onto the instant film sheet 10. Then, a full-color image is recorded while the printing head 25 moves once in the sub scan direction relative to the instant film sheet 10.

Figure 4:
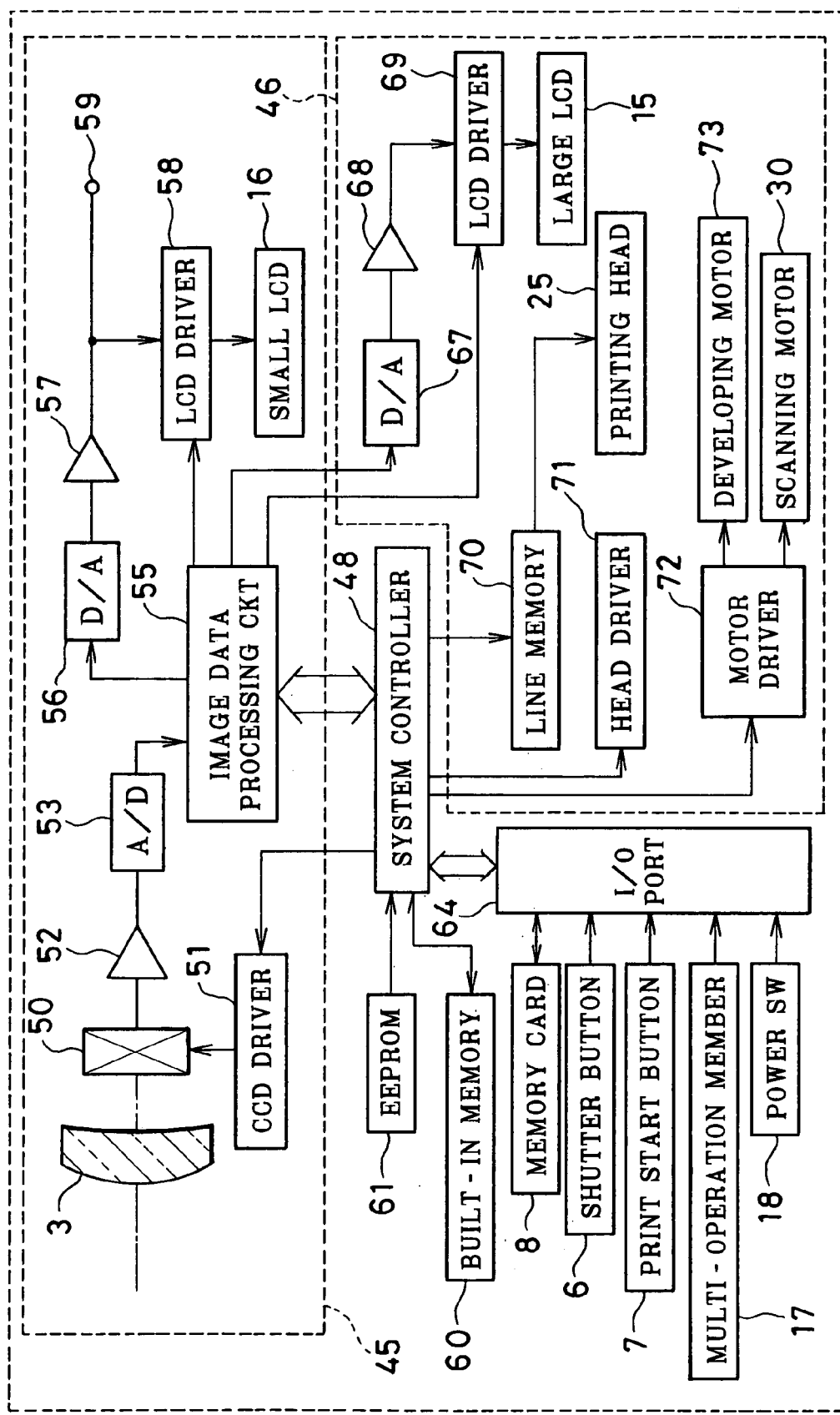
FIG. 4 is a block diagram illustrating a circuitry of the electronic still camera.

FIG. 4 shows the circuitry of the electronic still camera 1 of the present embodiment, wherein the camera section and the printer section are designated by 45 and 46 respectively. All electric components of the camera 1, including the camera section 45 and the printer section 46, are controlled by a system controller 48.

A main component of the camera section 45 is a CCD image sensor 50 that is located behind the camera lens 3. By focusing the camera lens 3, an optical image of a subject is formed on a photoelectric conversion surface of the CCD image sensor 50. Micro color filters for red, green and blue are arranged in a matrix on the photoelectric conversion surface, so an image signal representative of the optical image is color-sequentially output from the image sensor 50 as the image sensor 50 is driven by a CCD driver 51. The image signal is amplified to an appropriate level through an amplifier 52, and then converted into digital image data through an A/D converter 53. As well known in the art, the A/D converter 53 samples the image signal in synchronization with the driving timing of the CCD image sensor 50.

The digital image data is sequentially sent to an image data processing circuit 55 for white balance correction, gamma correction, and other processing of the digital image data. The image data processing circuit 55 also produces NTSC composite picture signal from the processed image data, and sends it to an output terminal 59 through a D/A converter 56 and an amplifier 57. By connecting a home TV to the output terminal 59, the home TV can display a series of subject images photographed through the CCD image sensor 50. The picture signal from the amplifier 57 is applied to an LCD driver 58 that drives the small LCD panel 16, so the small LCD panel 16 displays the moving images of the subject.

A built-in memory 60 is able to store the image data frame by frame, for example, up to 50 frames. An EEPROM 61 stores many kinds of sequence programs, control data and adjustment data that are referred to by the system controller 48 for controlling the camera 1. The system controller 48 monitors input signals from the shutter button 6, the print start button 7, the multi-operation member 17, the power switch 18, through an I/O port 64, to execute an operation program in accordance with the input signals. The memory card 8 may also be connected to the system controller 48 through the I/O port 64. The memory card 8 is able to store the image data frame by frame, for example, up to 50 frames. So the built-in memory 60 or the memory card 8 is alternatively used for storing the image data. The photographer may chose the built-in memory 60 or the memory card 8 by operating the multi-operation member 17.

The printer section 46 includes a D/A converter 67, an amplifier 68 and an LCD driver 69 for driving the large LCD panel 15, in addition to the printing head 25, the scanning motor 30, a line memory 70, a head driver 71, a motor driver 72, and the developing motor 73.

When an appropriate one of the image frames recorded in the built-in memory 60 or the memory card 8 is chosen by operating the multi-operation member 17, the image data of the chosen image frame is read by the image data processing circuit 55. Then, the image processing circuit 55 produces a NTSC composite signal from that image data, and sends it through the D/A converter 67 and the amplifier 68 to the LCD driver 69, so the image frame is displayed as a still image on the large LCD panel 15. Since the large LCD panel 15 is substantially the same in size as the printing area of the instant film sheet 10, and consists of substantially the same number of pixels as the image printed on the instant film sheet 10, the photographer can preview the finished print of the chosen image with high fidelity.

In printing, image data of one color of a full-color image frame to record is read out line by line from the built-in memory 60 or from the memory card 8, and the image data of one line is successively written in the line memory 70. The head driver 71 drives the printing head 25 in accordance with the image data of one line under the control of the system controller 48. In this embodiment, the head driver 71 controls the transparency or light transmittance of the individual liquid crystal segments of the LCD array 41 so as to control the intensity of the printing light in accordance with the image data.

Figure 5:
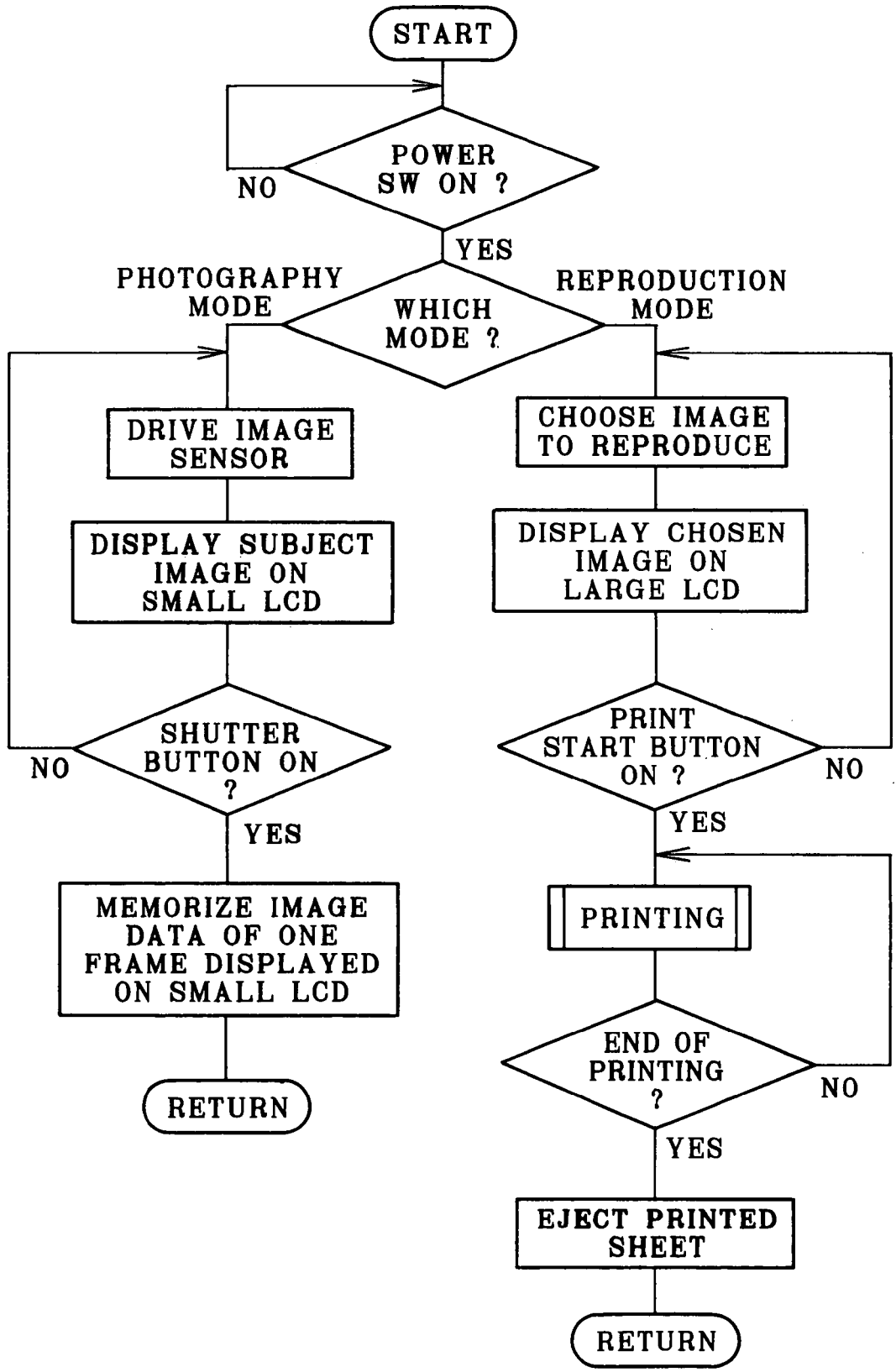
FIG. 5 is a flowchart illustrating an overall operation of the electronic still camera.

Now the operation of the camera 1 configured as above will be described with reference to FIG. 5.

When the power switch 18 is turned on, the camera 1 is set to the photography mode or the reproduction mode depending upon the switching position of the ring dial 17b of the multi-operation member 17.

In the photography mode, the CCD image sensor 50 continuously images subjects, so images of the subjects are displayed on the small LCD panel 16. Each time the photographer presses the shutter button 6, image data of one image frame displayed on the small LCD panel 16 at that moment is written on the memory card 8. It is possible to write the image data on the built-in memory 60, or exchange the image data between the memory card 8 and the built-in memory 60 by operating the multi-operation member 17.

In the reproduction mode, an appropriate one of the image frames recorded in the built-in memory 60 or the memory card 8 is chosen by operating the multi-operation member 17. Then, the image data of the chosen image frame is read in the image data processing circuit 55, so the image processing circuit 55 produces a NTSC composite signal from that image data, and sends it through the D/A converter 67 and the amplifier 68 to the LCD driver 69, so the image frame is displayed as a still image on the large LCD panel 15. On the other hand, the small LCD panel 16 is inactivated in the reproduction mode, for the sake of saving energy. But it is possible to keep the small LCD panel 16 active also in the reproduction mode.

When the print start button 7 is pressed while the image to print is displayed on the large LCD panel 15, the system controller 48 starts transferring red frame data of the displayed image one line after another to the line memory 70. After confirming that the red pass filter portion of the color filter 36 is inserted into the printing light path and that all the liquid crystal segments of the LCD array 41 are in their light-shielding condition, the system controller 48 turns on the fluorescent lamp 39.

After confirming that the printing head 25 is in the first terminal position as shown by phantom lines in FIG. 3 through a not-shown sensor, the system controller 48 starts transferring the red image data of the first line from the line memory 70 to the LCD array 41, the individual crystal segments of the LCD array 41 change their transmittance according to the corresponding image data, and then return to the light-shielding condition in a predetermined time.

The red printing light from the red pass filter portion of the color filter 40 travels through the respective liquid crystal segments, so the instant film sheet 10 is exposed to the red printing light beams of different amounts corresponding to the difference in the transmittance of the liquid crystal segments. It is to be noted that it will save time for printing one line when the image data of one line is concurrently transferred from the line memory 70 to the respective segments of the LCD array 41, to change the transmittance of the respective segment all at once.

At the conclusion of exposure to the red light beams for the first line, the scanning motor 24a rotates through a predetermined angle, shifting the printing head 32 to a position of a next line. Thereafter, red image data representative of pixel densities of the second line is transferred to the line memory 70, so the second line of the red frame is photographed on the instant film sheet 10 in the same way as for the first line. In this way, the red frame is photographed line after line on the instant film sheet 10.

After the exposure to the red printing light is completed, the system controller 55 sends the filter switching signal to the head driver 71, so the head driver 71 slides the color filter 40 in the direction Y by an amount to position the green pass filter portion in the printing light path. The system controller 48 then transfers green frame data of the image to print to the line memory 70 sequentially from the last line to the first line, while the printing head 25 is moved from the second terminal position to the first terminal position in synchronism with the driving timing of the LCD array 41. After the completion of recording the green frame on the instant film sheet 10, the blue pass filter portion of the color filter 40 is inserted in the printing light path, and a blue frame of the image to print is recorded line by line on the instant film sheet 10 in the same way as for the red frame, while the printing head 25 is moved from the second terminal position to the first terminal position.

Since the size of the printing area of the instant film sheet 10 and the size of the large LCD panel 15 are substantially equal to each other, and the image printed on the instant film sheet 10 consists of the approximately same number of pixels as the image displayed on the large LCD panel 15, almost the same image as previewed on the large LCD panel 15 is obtained as a hard copy.

After the three color frames are recorded in this way, the system controller 48 starts driving the developing motor 73 through the motor driver 72. Then, the exposed instant film sheet 10 is ejected out through the film ejection slot 11 by the claw member 33 and the film processing rollers 22. While the instant film sheet 10 is squeezed through the film processing roller 22, the pod 10a is ruptured, and processing fluid is spread over the film sheet 10. Thus, a positive image is developed on the instant film sheet 10 in a few minutes after the ejection.

The LCD panels 15 and 16 may be of a back-lit type or a reflective type. Instead of the LCD panel 15, it is possible to use another kind of display device for the monitor, such as plasma display device, electroluminescent display device and the like.

Figure 6:
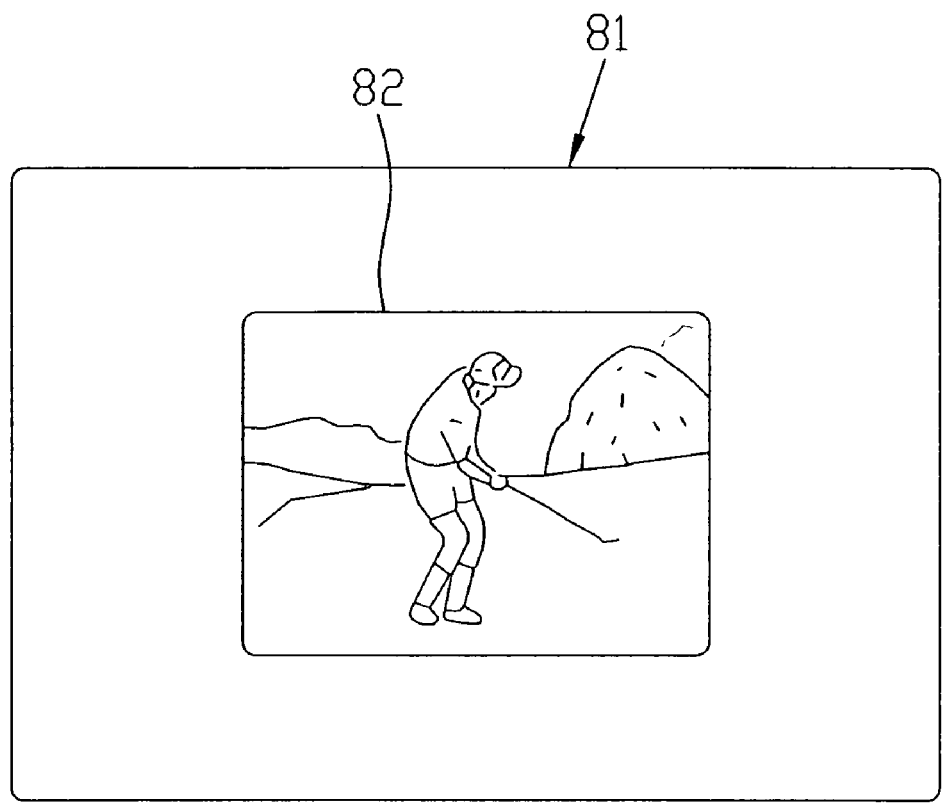
FIG. 6 is an explanatory diagram illustrating another embodiment of a monitor.

Although the large LCD panel 15 has almost the same size as the printing area of the instant film sheet 10 in the above embodiment, the monitor may have a screen of a different size from the printing area, insofar as the displayed image is substantially equal in magnification to the printed image. For example, as shown in FIG. 6, it is possible to provide a larger display panel 81 than a printing area 82 of the instant film sheet and display an image simulating a finished print at the same magnification in a partial area of the display panel 81, that is equal in size to the printing area 82.

Figure 7:
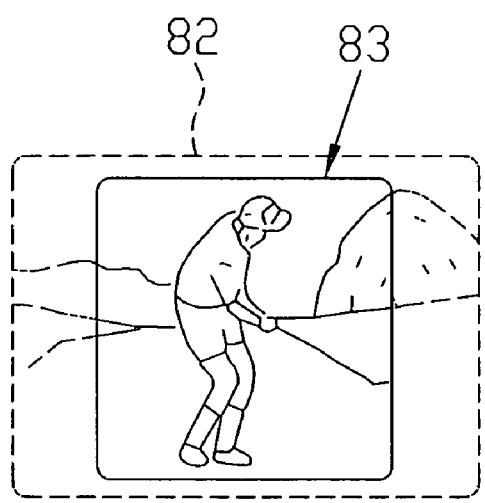
FIG. 7 is an explanatory diagram illustrating still another embodiment of a monitor.

It is also possible to use a smaller display panel 83 than the printing area 82, as shown in FIG. 7, and display the simulative image at the same magnification as the finished print. In this embodiment, the simulative image is partly displayed on the display panel 83, so it is necessary to scroll the image on the display panel 83 for observing the entire image.

The number of pixels of the monitor display panel is not necessarily equal to that of the printed image, but the monitor display panel may consist of a larger number of pixels than the printed image. Where the monitor display panel is larger than the printing area, the simulative image may be displayed in a partial area of that display panel, that corresponds in pixel number to the printed image. Where the display panel is constituted of three color pixels arranged in a matrix pattern, the total number of pixels of the display panel may be three times the pixel number of the printed image.

It is not always necessary to provide two display panels separately as an electronic viewfinder and a monitor. It is alternatively possible to provide a single large display panel, and switch over display formats between the photography mode and the reproduction mode. It is also possible to provide the electronic still camera with an optical viewfinder and a monitor for displaying an electronic image at the same magnification as a finished print.

Although the present invention has been described with respect to the electronic still camera with a printer section, the present invention is also applicable to a printer with a monitor panel incorporated therein for displaying an image simulating a finished print.

Although the printer section of the above embodiment makes a hard copy of an image by exposing an instant film sheet line by line through a linear optical printing head, it is possible print an image on the instant film sheet by projecting the two-dimensional image displayed on the display device onto the instant film sheet through a printing lens.

The printer section or the printer is not to be limited to an optical type, but may be of any kind, such as a thermosensitive type, a thermal transfer type, an ink jet type and so forth.

Thus, the present invention is not to be limited to the above embodiments but, on the contrary, various modifications will be possible for those skilled in the art without departing from the scope of the invention as defined in the appended claims.

What is claimed is:

1. An electronic still camera with a printer incorporated therein, the electronic still camera being capable of picking up an electronic image signal from a subject through an imaging device and printing an image on a recording material based on said electronic image signal, comprising:

a monitor that is incorporated into said camera and able to display an image based on said electronic image signal at substantially the same magnification as the image printed on the recording material by said printer;

wherein the image on said monitor can be viewed concurrently with the printing of the image on said printer, and wherein the monitor consists of pixels that are approximately equal in number to pixels of the image printed in a predetermined printing area of the recording material.

2. An electronic still camera as claimed in claim 1, wherein the monitor is an LCD panel.

3. An electronic still camera as claimed in claim 1, wherein the recording material is a self-developing type instant photo film.

4. An electronic still camera with a printer incorporated therein, the electronic still camera being capable of picking up an electronic image signal from a subject through an imaging device and printing an image on a recording material based on said electronic image signal, comprising:

a monitor that is incorporated into said camera and able to display an image based on said electronic image signal at substantially the same magnification as the image printed on the recording material by said printer;

wherein the image on said monitor can be viewed concurrently with the printing of the image on said printer, and wherein the monitor has a screen size that is approximately equal to a predetermined printing area of the recording material.

5. An electronic still camera as claimed in claim 4, wherein the monitor consists of pixels that are approximately equal in number to pixels of the image printed in a predetermined printing area of the recording material.

6. An electronic still camera as claimed in claim 4, further comprising an electronic viewfinder for displaying moving images of the subject in a real time fashion based on the electronic image signal picked up through the imaging device, wherein the electronic viewfinder is smaller in size than the monitor.

7. An electronic still camera as claimed in claim 4, wherein the monitor is an LCD panel.

8. An electronic still camera as claimed in claim 4, wherein the recording material is a self-developing type instant photo film.

9. A printer for printing an image on a recording material based on electronic image signal, comprising a monitor that is incorporated into a printer body, for displaying an image based on the electronic image signal at approximately the same magnification as when the image is printed on the recording material, wherein the image on said monitor can be viewed concurrently with the printing of the image on said printer, and wherein the monitor consists of pixels that are approximately equal in number to pixels of the image printed in a predetermined printing area of the recording material.

10. A printer as claimed in claim 9, wherein the recording material is a self-developing type instant photo film.

11. A printer as claimed in claim 9, wherein the monitor is an LCD panel.

12. A printer as claimed in claim 9, wherein said printer uses a three color frame printing process.

13. A printer for printing an image on a recording material based on electronic image signal, comprising a monitor that is incorporated into a printer body, for displaying an image based on the electronic image signal at approximately the same magnification as when the image is printed on the recording material, wherein the image on said monitor can be viewed concurrently with the printing of the image on said printer, and wherein the monitor has a screen size that is approximately equal to a predetermined printing area of the recording material.

14. A printer as claimed in claim 13, wherein the monitor consists of pixels that are approximately equal in number to pixels of the image printed in a predetermined printing area of the recording material.

15. A printer as claimed in claim 13, wherein the recording material is a self-developing type instant photo film.

16. A printer as claimed in claim 13, wherein the monitor is an LCD panel.

17. A printer as claimed in claim 13, wherein said printer uses a three color frame printing process.

* * * * *